United States Patent
Ikeno et al.

(10) Patent No.: US 7,826,109 B2
(45) Date of Patent: Nov. 2, 2010

(54) MULTIFUNCTION DEVICE

(75) Inventors: Takahiro Ikeno, Seto (JP); Teruo Deshimaru, Nagoya (JP); Tatsuya Sato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 920 days.

(21) Appl. No.: 11/678,683

(22) Filed: Feb. 26, 2007

(65) Prior Publication Data

US 2007/0201100 A1 Aug. 30, 2007

(30) Foreign Application Priority Data

Feb. 27, 2006 (JP) ............................. 2006-051354

(51) Int. Cl.
*H04N 1/04* (2006.01)

(52) U.S. Cl. ...................... 358/498; 358/474; 358/496; 358/296

(58) Field of Classification Search ................ 358/498, 358/474, 496, 296; 271/207, 213
See application file for complete search history.

(56) References Cited

U.S. PATENT DOCUMENTS

2003/0231367 A1* 12/2003 Quintana .................... 358/527
2004/0234292 A1* 11/2004 Sato et al. ................... 399/107
2006/0139337 A1* 6/2006 Fukao ........................ 345/173

FOREIGN PATENT DOCUMENTS

| JP | 2002165869 A | 6/2002 |
| JP | 2003308513 A | 10/2003 |
| JP | 2004046246 A | 2/2004 |
| JP | 2004137070 A | 5/2004 |
| JP | 2004233490 A | 8/2004 |
| JP | 2004279691 A | 10/2004 |
| JP | 2004279692 A | 10/2004 |
| JP | 2005017425 A | 1/2005 |
| JP | 2005091389 A | 4/2005 |
| JP | 2005099852 A | 4/2005 |
| JP | 2005229532 A | 8/2005 |
| JP | 2005258025 A | 9/2005 |
| JP | 2005286608 A | 10/2005 |
| JP | 2005323184 A | 11/2005 |

* cited by examiner

*Primary Examiner*—Houshang Safaipour
(74) *Attorney, Agent, or Firm*—Baker Botts, LLP.

(57) ABSTRACT

A multifunction device includes an image scanning unit and an image printing unit. The multifunction device further includes an operation panel which is positioned on a front side of the image scanning unit. The operation panel includes a display portion. Each of the display portion and the operation panel has a horizontal center line and a vertical center line which is perpendicular to the horizontal center line. A length of the vertical center line of the display portion is about equal to a length of the vertical center line of the operation panel. A ratio of a length of the horizontal center line of the display portion to the length of the vertical center line of the display portion is greater than 4/3.

18 Claims, 10 Drawing Sheets

MULTIFUNCTION DEVICE

CROSS REFERENCE TO RELATED APPLICATION

The present application claims priority from Japanese Patent Application No. 2006-051354, which was filed on Feb. 27, 2006, the disclosure of which is incorporated herein by reference in its entirety.

FIELD OF THE INVENTION

The present invention relates to a multifunction device which has an image printing unit, an image scanning unit mounted to the image printing unit, and an operation panel.

BACKGROUND OF THE INVENTION

A known multifunction device includes a plurality of units, such as a scanning unit and an image printing unit, which perform a plurality of different functions, such as a copying function, a printing function, a scanning function, and a facsimile function. For example, the image printing unit may perform the printing function and/or a facsimile receiving function, and the image scanning unit may perform the copying function, the scanning function, and/or a facsimile sending function. The known multifunction device also may include operation panel which is provided on a front side of the multifunction device and is configured to input instructions to the device.

The known multifunction device also includes a display portion for displaying an operation state of the device or information which is inputted by a user via the operation panel. The user readily may confirm the operation state of the device or the inputted information when the user views the information displayed on the display portion.

A known display portion may have a display device, such as a liquid crystal display device, having an aspect ratio, i.e., a ratio of a length of a vertical center line of the display device to a length of a horizontal center line of the display device, of 3:4.

In the known multifunction device, the image scanning unit is disposed on the image printing unit, and the operation panel is mounted to the front of the multifunction device. Moreover, a length of a vertical center line of a display portion provided on the operation panel depends on the length of the vertical center line of the operation panel. Specifically, when the length of the vertical center line of the display portion is greater than the length of the vertical center line of the operation panel, a size of the multifunction device increases, and a shape of the multifunction device becomes more complicated.

In an office or the like, standard paper, such as an A or B size paper, generally has a horizontal to vertical ratio of $\sqrt{2}:1$. When a plurality of pages of image data is obtained by scanning a plurality of documents having a horizontal to vertical ratio of $\sqrt{2}:1$, the vertical length of the image is restricted. Specifically, when the vertical length of a horizontally long image is displayed in the display device having the aspect ratio of 3:4, the image data for the first page is displayed, however, only a portion of the image data for the second page is displayed. Moreover, multi-page images may not be horizontally displayed with reducing the image size, which makes it difficult to recognize the image and increases a size of a portion of the display which is not used to display an image.

SUMMARY OF THE INVENTION

Therefore, a need has arisen for multifunction devices which overcome these and other shortcomings of the related art. A technical advantage of the present invention is that the image readily may be recognized when a user of a multifunction device views the image on the display portion without increasing a size of the multifunction device. Another technical advantage is that a portion of the display portion which is not used to display the image may be minimized.

According to an embodiment of the present invention, a multifunction device comprises an image scanning unit and an image printing unit. The multifunction device further comprises operation panel which is positioned on a front side of the image scanning unit. The operation panel comprises a display portion. Each of the display portion and the operation panel has a horizontal center line and a vertical center line witch is perpendicular to the horizontal center line. A length of the vertical center line of the display portion is about equal to a length of the vertical center line of the operation panel. A ratio of a length of the horizontal center line of the display portion to the length of the vertical center line of the display portion is greater than 4/3.

According to another embodiment of the present invention, a multifunction device comprises an image printing unit. The image printing unit comprises a front wall, a back wall opposite the front wall of the image printing unit, and at least one side wall which is connected and substantially perpendicular to each of the front wall of the image printing unit and the back wall of the image printing unit. A distance between the front wall of the image printing unit and the back wall of the image printing unit comprises a maximum depth dimension of the multifunction device. The multifunction device further comprises an image scanning unit mounted to the image printing unit. The image scanning unit comprises a back wall, and at least one side wall which is connected to the back wall of the image scanning unit. The back wall of the image scanning unit is continuous and substantially flush with the back wall of the image printing unit. The at least one side wall of the image scanning unit is continuous and substantially flush with a first portion of the at least one side wall of the image printing unit. Moreover, the multifunction device comprises an operation panel mounted on a front side of the multifunction device. The operation panel comprises a front wall, and at least one side wall which is connected to the front wall of the operation panel. Each portion of the front wall of the operation panel is at least one of slanted with respect to and substantially flush with the front wall of the image printing unit. The at least one side wall of the operation panel is continuous and substantially flush each of the at least one side wall of the image scanning unit and a second portion of the at least one side wall of the image printing unit.

Other objects, features, and advantage will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the features and technical advantages thereof, reference now is made to the following descriptions taken in connection with the accompanying drawings.

DETAILED DESCRIPTION OF EMBODIMENTS

Embodiments of the present invention and their features and technical advantages may be understood by referring to FIGS. 1-10, like numerals being used for like corresponding portions in the various drawings.

Figure 1:
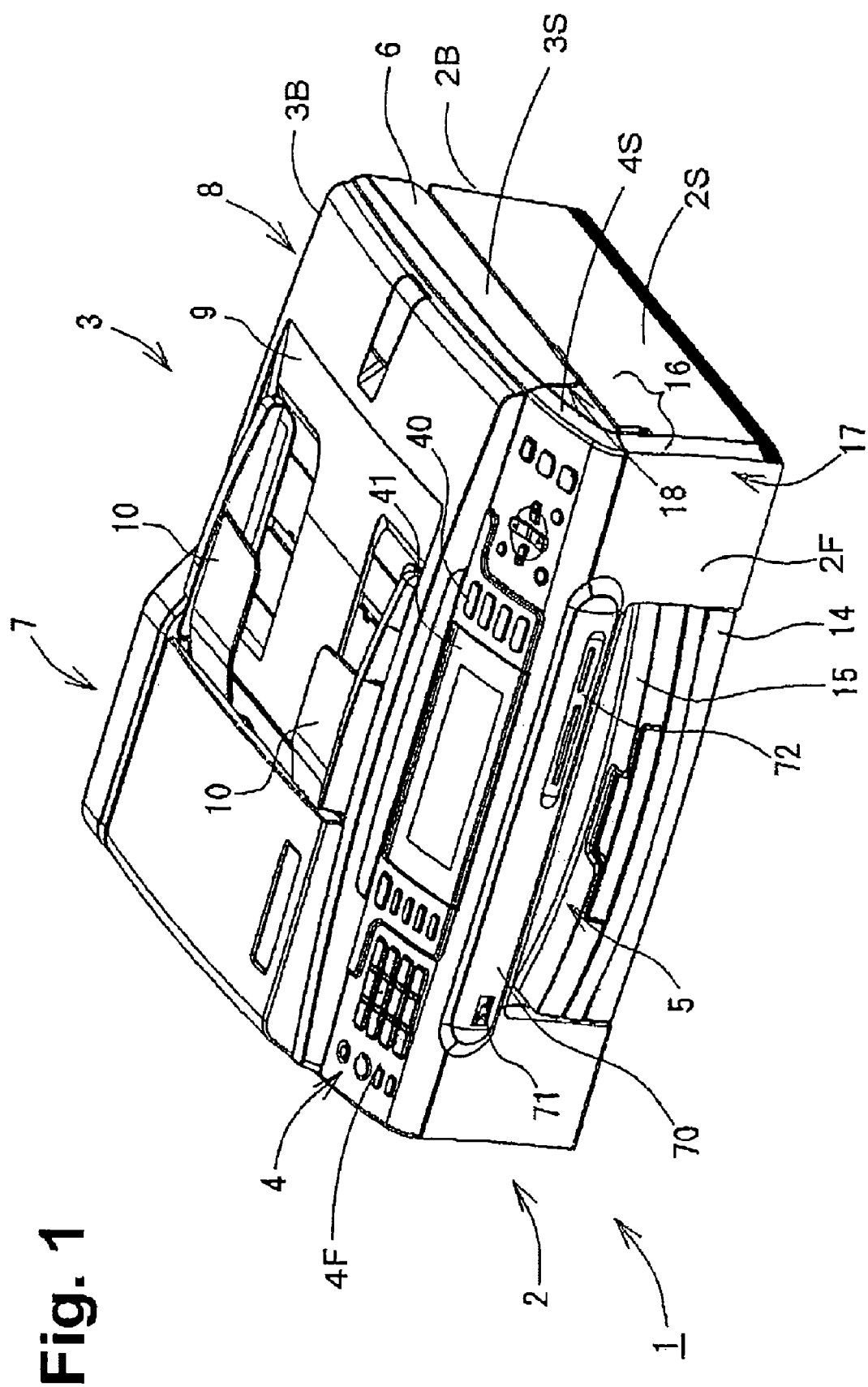
FIG. 1 is a perspective view of a multifunction device, according to an embodiment of the present invention.
Figure 2:
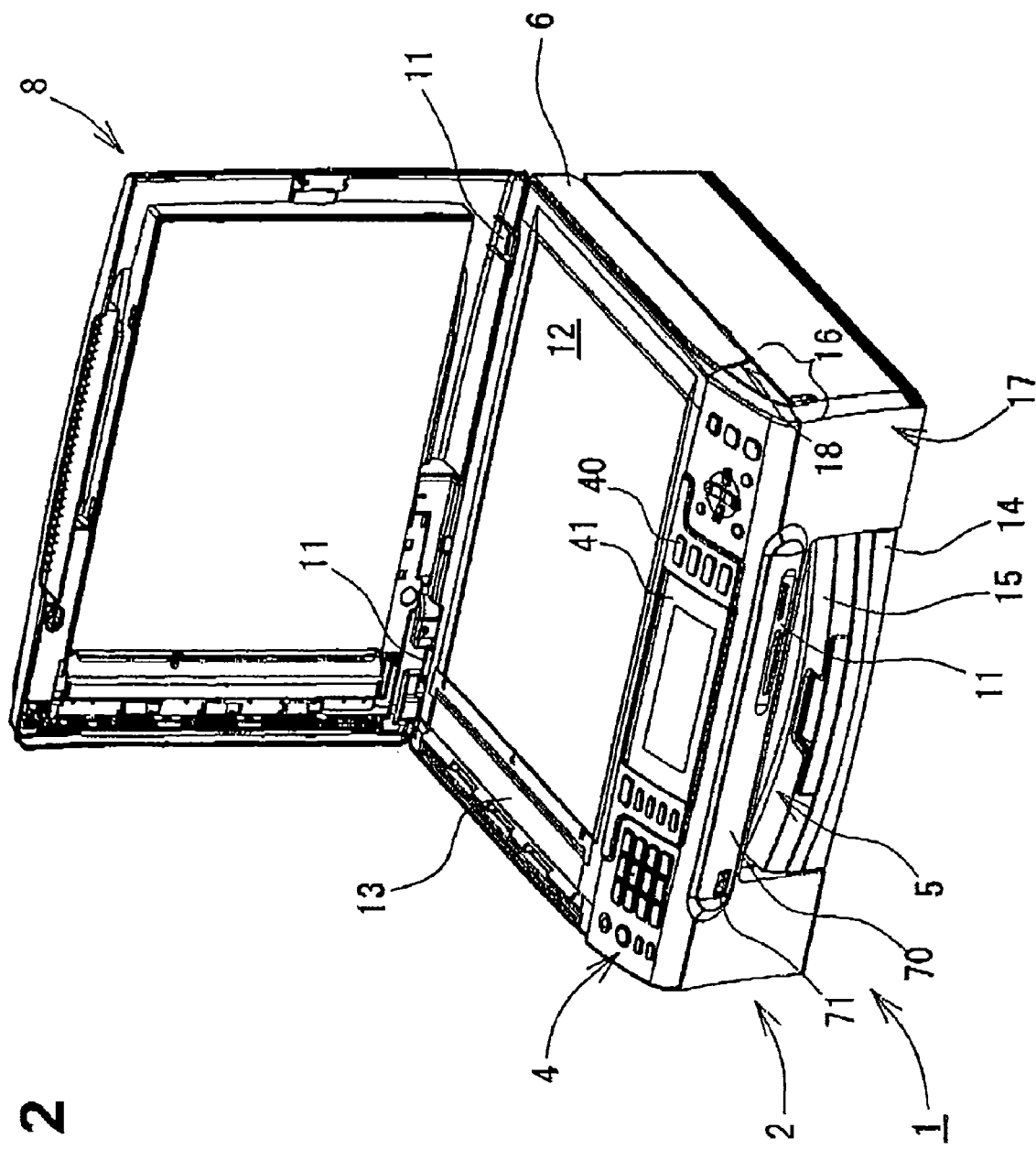
FIG. 2 is a perspective view of the multifunction device of FIG. 1 when a document cover of the multifunction device is open

Referring to FIGS. 1 and 2, a multifunction device (MFD) 2 may comprise au image printer unit 2, an image scanner unit 3 mounted to the printer unit 2, and an operation panel 4 mounted on a front side of the scanner unit 3. The printer unit 2 may comprise a front wall 2F, a back wall 2B opposite the front wall 2F, and a pair of side walls 2S which are connected and substantially perpendicular to each of the front wall 2F and the back wall 2B. A distance between the front wall 2F and the back wall 2B corresponds to a maximum depth dimension of the multifunction device 1. The scanner unit 3 may comprise a back wall 3B and a pair of side walls 3S. Each of the side walls 3S may be connected to the back wall 3B. The back wall 3B is continuous and substantially flush with the back wall 2B, and each of the side walls 3S is continuous and substantially flush with the corresponding side wall 2S. The operation panel 4 may comprise a front wall 4F and a pair of side walls 4S. The side walls 4S may be connected to the front wall 4F, and the front wall 4F may be slanted with respect to the front wall 2F. The front wall 4F also may be substantially flush with the front wall 2F. Each of the side walls 4S is continuous and substantially flush with a corresponding one of side walls 3S and a corresponding one of the side wall 2S. The multifunction device 1 is configured to perform a plurality of functions, such as printing, scanning, copying, facsimile, or the like, or any combination of at least two functions thereof.

The multifunction device 1 may be connected to a computer (not shown) to print an image or document on a recording/printing medium, such as a paper, cloth, a transparent film sheet for OHP, or the like, based on image data or document data received from the computer. The multifunction device 1 also may be connected to an external device, such as a digital camera, to print the image data sent from the digital camera. The multifunction device 1 may be installed Bath various types of memory media, such as a memory card, to print image data and the like stored in the memory media.

In an embodiment of the present invention, a document cover 8 of the scanning unit 3 may comprise an auto document feeder 7 ("ADF") which is mounted in a document scanning support 6 functioning as FBS (Flatbed Scanner) through a hinge 11 in the back part, such that the document cover 8 may be selectively opened and closed. As shown in FIG. 2, a platen glass 12 is disposed above the document scanning support 6 and an image scanning sensor unit (not shown) is positioned in the document scanning support 6.

The platen glass 12 may be a horizontally long rectangular glass in a plan view, and the horizontal length of the platen glass 12 may be greater than the vertical length of the platen glass 12. The platen glass 12 may have a size, such that a rectangular document may be placed in a horizontal direction. For example, the platen glass 12 may be formed, such that documents of the letter size (215.9 mm×279.4 mm (8.5 inch× 11 inch)) and documents of the A4 size (210 mm×297 mm) may be positioned in the horizontal direction. Therefore, the platen glass 12 may be designed, such that the vertical length and the horizontal length correspond to a length of a short edge (215.9 mm) of the letter size document and a length of a long edge of the A4 size document (297 nun), respectively, in the plan view. The horizontal direction refers to a direction, such that a long edge of a document is extending horizontally.

A maximum size of the document which may be scanned by the image scanning sensor unit (not shown) may be set, so as to adjust the size of the platen glass 12. A length of a main scanning direction of a line image sensor, which the image scanning sensor unit comprises, may be greater than or equal to 215.9 mm, so as to correspond to the short edge of a letter size document. When the image scanning sensor unit moves in the width direction, the moving distance of the image scanning sensor unit may be greater than or equal to 297 mm in length, so as to correspond to the length of the long edge of A4 size document.

The upper surface of the document scanning support 6 may be substantially open, and the platen glass 12 may be inserted in the opening portion. Because a movement space of the image scanning sensor unit (not shown) or a space in which the image scanning sensor unit, a member supporting the image scanning sensor unit, and a unit driving the image scanning sensor unit are provided, is inside the document scanning support 6, the upper surface of the document scanning support 6 may be larger than the platen glass 12. Nevertheless, the document scanning support 6 and platen glass 12 may be similar in shape in the plan view.

When the scanner unit 3 is used as FBS, the document cover 8 is opened to allow a document to be positioned on the platen glass 12, and the document cover 8 then is closed to fix the document. Sequentially, when the scanning operation begins, the image scanning sensor unit (not shown) scans the document along the back surface of the platen glass 12, thereby scanning the image of the document by FBS.

The image scanning sensor unit (not shown), which has the line image sensor in which a depth direction of the multifunction device 1 is the main scanning direction, emits a light source to irradiate the light on the document, and then the reflected light from the document is guided to a photoelectric transducer via a lens. The photoelectric transducer outputs an electric signal according to an intensity of the reflected light. An example the line image sensor may be a contact image sensor (CIS), a reduced optical system-charge coupled device (CCD), a complementary metal-oxide semiconductor (CMOS), or the like.

The ADF 7 transports a document from a document tray 9 to a document discharge tray 10 through a document transport path. When the ADF 7 is transporting the document, the document passes a scanning surface 13 on the document scanning support 6, and the image of the document is scanned by the image scanning sensor unit (not shown) in a standby state under the scanning surface 13. The ADF 7 scans the image with the document cover 8 closed with respect to the document scanning support 6. The ADF 7 may have any known structure.

The printer unit 2 may be an inkjet image printing device which selectively ejects ink droplets onto a recording medium to print an image based on image data which is scanned by the scanner unit 3 or is externally entered. As described above, the printer unit 2 may be positioned below the scanner unit 3. The scanner unit 3 and the printer unit 2 may be located, such that the back surfaces 2B and 3B thereof are continuous and substantially flush with each other. Moreover, various image printing methods, such as an electrograph, a thermal transfer and the like may be employed.

A opening 5 may be formed on a front side of the multifunction device 1. A pickup tray 14 and a discharge tray 15 may be provided, so as to be completely contained in the opening 5. The pickup tray 14 and discharge tray 15 may be disposed, so as to be two-tiered, and the discharge tray 15 may be provided in the upper tier and the pickup tray 14 in the lower tier. The pickup tray 14 may be substantially a rectangular container in shape, and a rectangular printing paper may be loaded in a vertical direction in the plan view. A pickup tray 14 may be configured to accommodate printing paper of a letter size or an A4 size in the vertical direction thereof. For example, the vertical length of the pickup tray 14 may be greater than or equal to 297 mm and may correspond to the length of the long edge of the A4 size, and the horizontal length may be greater than or equal to 215.9 mm and may corresponding to the length of the short edge of the letter size.

Because the pickup tray 14 may have the shape described above, the printer unit 2 may be configured to print an image with a printable maximum size on the letter size or A4 size paper. For example, when the printer unit 2 is an inkjet printing device, a moving range in which an inkjet printing head moves to eject ink droplets may be greater than or equal to 215.9 mm and may correspond to the short edge of the letter size printing paper.

Because the document scanning support 6 may have a horizontally long parallelepiped shape as described above, an end surface 17 on the front surface of the printer unit 2 may project to the front surface from an end surface on the front of the scanner unit 3 by a predetermined length. Hereinafter, the end portion on the front surface of the printer unit 2 projected to the front surface is called a projection portion 16. Further, the horizontal length of the printer unit 2 may be about equal to that of the scanner unit 3. Accordingly, the multifunction device 1 may be substantially square shaped in the plan view.

The document scanning support 6 may have a size, such that a document with the letter size may be placed in the direction that the long edge of the printing paper extends horizontally. The pickup tray 14 may have a size, such that the printing paper may be placed in the direction that the long edge of the printing paper extends vertically as described above, a projecting length of the projection portion 16 is a length which is about equal to the vertical length of the printer unit 2 minus that of the document scanning support 6, that is, the length which is largely set to the length of the long edge of the A4 size minus the length of the short edge of the letter size. Because the horizontal length of the printer unit 2 way be equal to that of scanner unit 3 above the projection portion 16, a vacant space with a horizontally long parallelepiped may be formed, and the operation panel 4 of the multifunction device 1 may be disposed in the vacant space.

The printer unit 2 has a document transfer path (not shown) which may extend in an upward direction from the inner side of the pickup tray 14 and may be curved to the front surface in U-shape to be connected to the discharge tray 15. A printing paper accommodated in the pickup tray 14 is sent through the document transfer path and u-turns to be guided to an image printing location in the middle of the document transfer path, such that the short edge of the printing paper is sent in the first place. An image is printed on the printing paper in the image printing location by the inkjet printing device. After printing the image, the printing paper is discharged into the discharge tray 15.

The operation panel 4 is provided on the front surface of the multifunction device 1. The operation panel 4 is formed to be horizontally long in shape, as shown in FIGS. 1 and 2, such that the operation panel 4 is suited to the vacant space above the projection portion 16. The operation panel 4 may comprise various types of operation keys 40 and a liquid crystal display (LCD) 41. A user may input a desired instruction using the operation panel 4. When any instruction is inputted to the multifunction device 1, an operation of the multifunction device 1 is controlled by a control portion 20 in accordance with the inputted information. The multifunction device 1 also may be connected to a computer to be operated in accordance with an instruction sent through a printer driver or a scanner driver of the computer.

A connection panel 70 may be provided above the opening 5 of the printer unit 2. A USB terminal 71 may be disposed on the left end of the connection panel 70. The USB terminal 71 is a connector terminal connecting an external device to the multifunction device 1 in order to communicate the external device by connecting the external device to the USB. A slot portion 72 is disposed on the right end of the connection panel 70. The slot portion 72 has a plurality of card slots into which memory cards may be inserted. When the memory cards are inserted into the card slots, the image data is read from the memory cards by the control portion 20, and the read image data or the image-related information is displayed on the liquid crystal portion 41 by the control portion 20. Alternatively, any selected image is printed on the printing paper by the printer unit 2.

Figure 3:
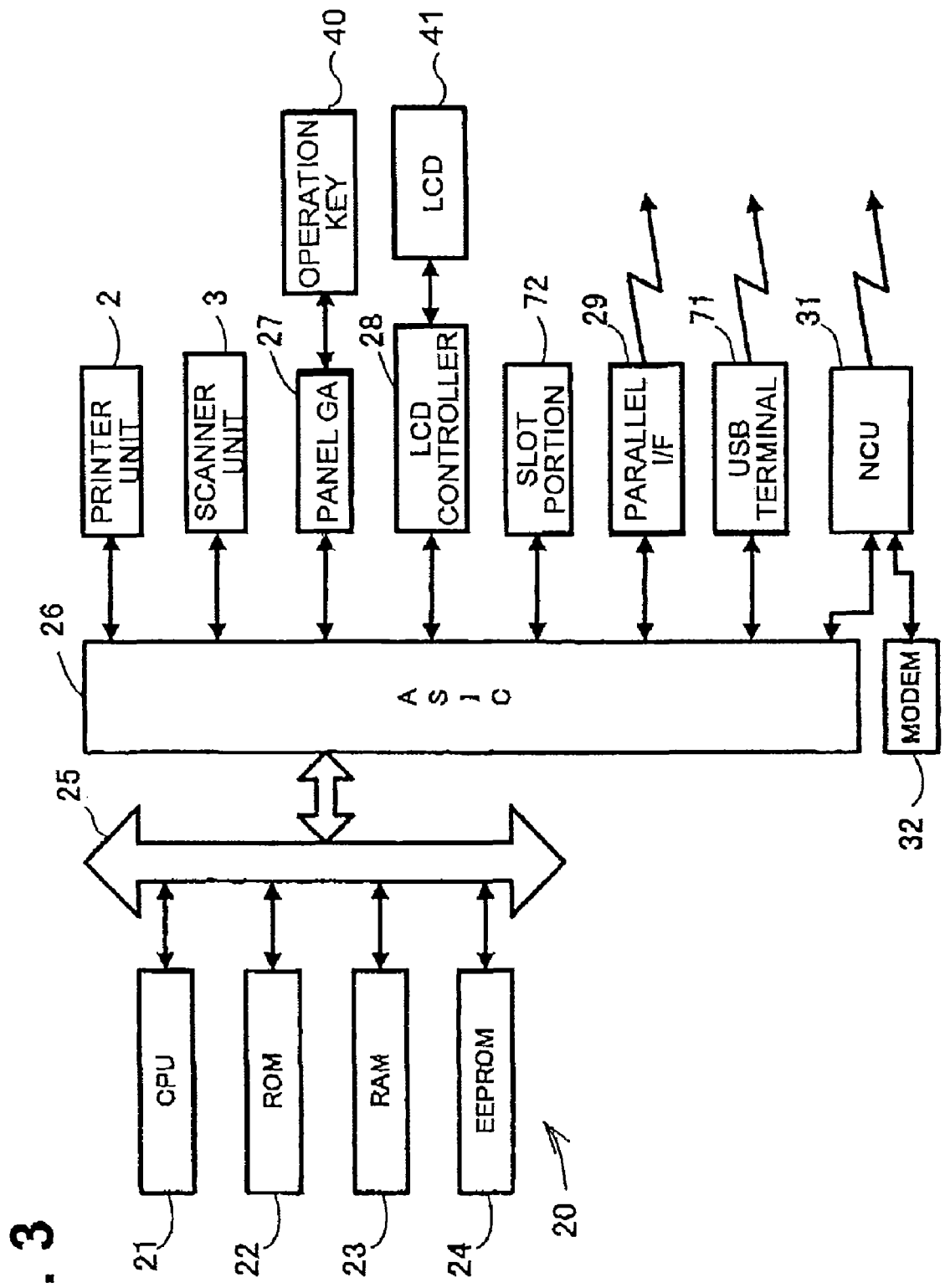
FIG. 3 is a block diagram of a controlling portion for controlling the multifunction device of FIG. 1.

Referring to FIG. 3, the control portion 20 generally controls the operation of the multifunction device 1. The control portion 20 may have a micro-computer structure with a central processing unit (CPU) 21, a read only memory (ROM) 22, a random access memory (RAM) 23, and an electrically erasable and programmable ROM (EEPROM) 24, and may be connected to an application specific integrated circuit (ASIC) 26 via a bus 25.

ROM 22 stores a program and the like for controlling various operations of the multifunction device 1. RAM 23 is used as a storage area or a work area in which various kinds of data used to execute the program by CPU 21 are temporarily stored.

ASIC 26 controls operations of the printer unit 2, scanner unit 3, the operation panel 4, and slot portion 72 in accordance with instructions of CPU 21. Moreover, a motor driving the inkjet-printing head and ADF 7 of the scanner unit 3, or an operation of the image scanning sensor unit (not shown), also may be controlled.

A panel gate array 27 controlling the operation keys 40 in which desired instructions are inputted into the multifunction device 1 is connected to ASIC 26. The panel gate array 27 detects pressures of the operation keys 40 to output predetermined code signals. These key codes are assigned, so as to correspond to a plurality of operation keys 40. When CPU 21 receives the predetermined key codes from the panel gate array 27, CPU 21 executes control processes in accordance with a predetermined key-process table. The key-processing table corresponds to the key codes and the control processing, and is stored, for example, in ROM 22.

An LCD controller 28 controlling a screen display of the liquid crystal display portion 41 is connected to ASIC 26. The LCD controller 28 displays information associated with an operation of the printer unit 2 or the scanner unit 3, a scanned image, or an inputted image on the liquid crystal display portion 41 in accordance with an instruction of CPU 21.

A parallel interface 29 and the USB terminal 71 for transporting data to or from a computer through a parallel cable or a USB cable are connected to ASIC 26. A network control unit (NCU) 31 or a modem 32 for executing a facsimile function is connected to ASIC 26.

Referring to FIGS. 1 and 2, the operation panel 4 is positioned above the projection portion 16 of the printer unit 2 and on the front surface of the scanner unit 3. The operation panel 4 has the various operation keys 40 and the liquid crystal display portion 41.

Figure 4:
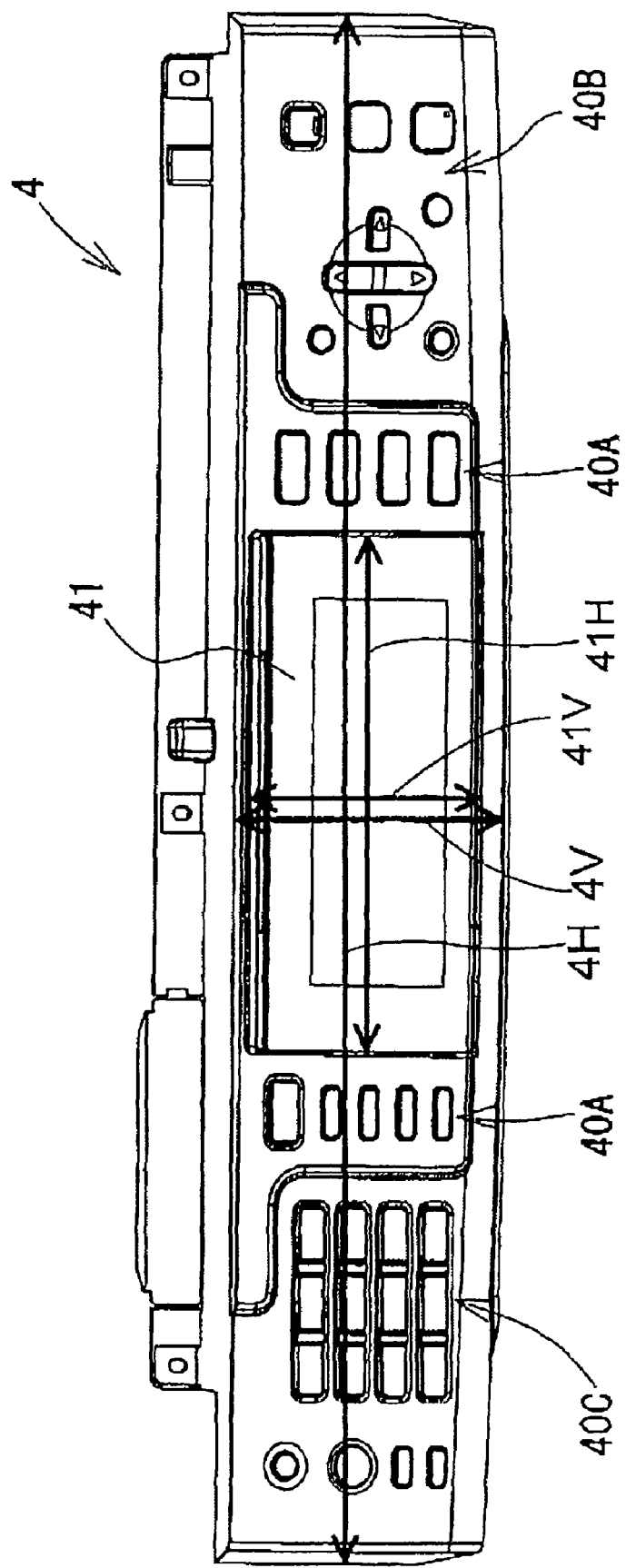
FIG. 4 is a partial, plan view of an operation panel of the multifunction device of FIG. 1.

Referring to FIG. 4, the liquid crystal display portion 41 has a horizontally long rectangular shape in the plan view. The vertical length may be shorter than a depth of the operation panel 4, but the depth of liquid crystal display 41 may be about equal to the depth of the operation panel 4. Accordingly, in the inside and on the front side of the liquid crystal display portion 41, there may be substantially no space for disposing the operation keys 40 in the operation panel 4. The length of the horizontal center line 41H of the liquid crystal display portion 41 may be greater than 4/3 of the length of the vertical center line 41V thereof, such that a ratio of the length of the horizontal center line 41H to the length of the vertical center line 41V of the liquid crystal display portion 41 is greater than 4:3. According to an embodiment of the present invention, LCD modules 60 and 61, which may correspond to thin film displays (see FIG. 7), in which an aspect ratio is 4:3 may be arranged in a line in the horizontal direction, such that the LCD unit 44 may be used as a component of the liquid crystal display portion 41. Accordingly, a ratio of the length of the horizontal center line 41H to the length of the vertical center line 41V of the liquid crystal display portion 41 may be 8/3. For example, even when image data of a plurality of documents of the A4 size or letter size are displayed in the vertical direction on the liquid crystal display portion 41, two or more image data may be arranged in a line in the horizontal direction and may be displayed on one screen by using such a horizontally long liquid crystal display portion 41. Accordingly, the displayed image or the characters contained therein readily may be recognized by a user of the multifunction device 1.

As shown in FIG. 4, the liquid crystal display portion 41 may be disposed in the middle of the operation panel 4 in the horizontal direction, and the horizontal length of the liquid crystal display portion may be sufficiently less than the horizontal length of the operation panel 4, such that there is sufficient space for including the operation keys 40 in the operation panel 4. By arranging the liquid crystal display portion 41 in the middle of the operation panel 4, the operation keys 40 may be positioned beside the right and left of the liquid crystal display portion 41, such that the liquid crystal display portion 41 may be located to be balanced with respect to the arrangement of the operation keys 40.

The operation keys 40 may comprise operation keys 40A provided around the liquid crystal display portion 41, operation keys 40B provided on the right side of the operation panel 4, and operation keys 40C provided on the left side of the operation panel 4. The operation keys 40A are arranged in two lines around and along the right and left edges of the liquid crystal display portion 41. The spaces beside both sides of the liquid crystal display portion 41 may be effectively utilized by arranging the operation keys 40A beside the right and left of the liquid crystal display portion 41 in this manner. The operation panel 4 has a horizontal center line 4H and a vertical center line 4V which is perpendicular to the horizontal center line 4H. The display portion 41 has a horizontal center line 41H and a vertical center line 41V which is perpendicular to the horizontal center line 41H. A length of the vertical center line 41V of the display portion 41 is about equal to a length of the vertical center line 4V of the operation panel 4.

Figure 5:
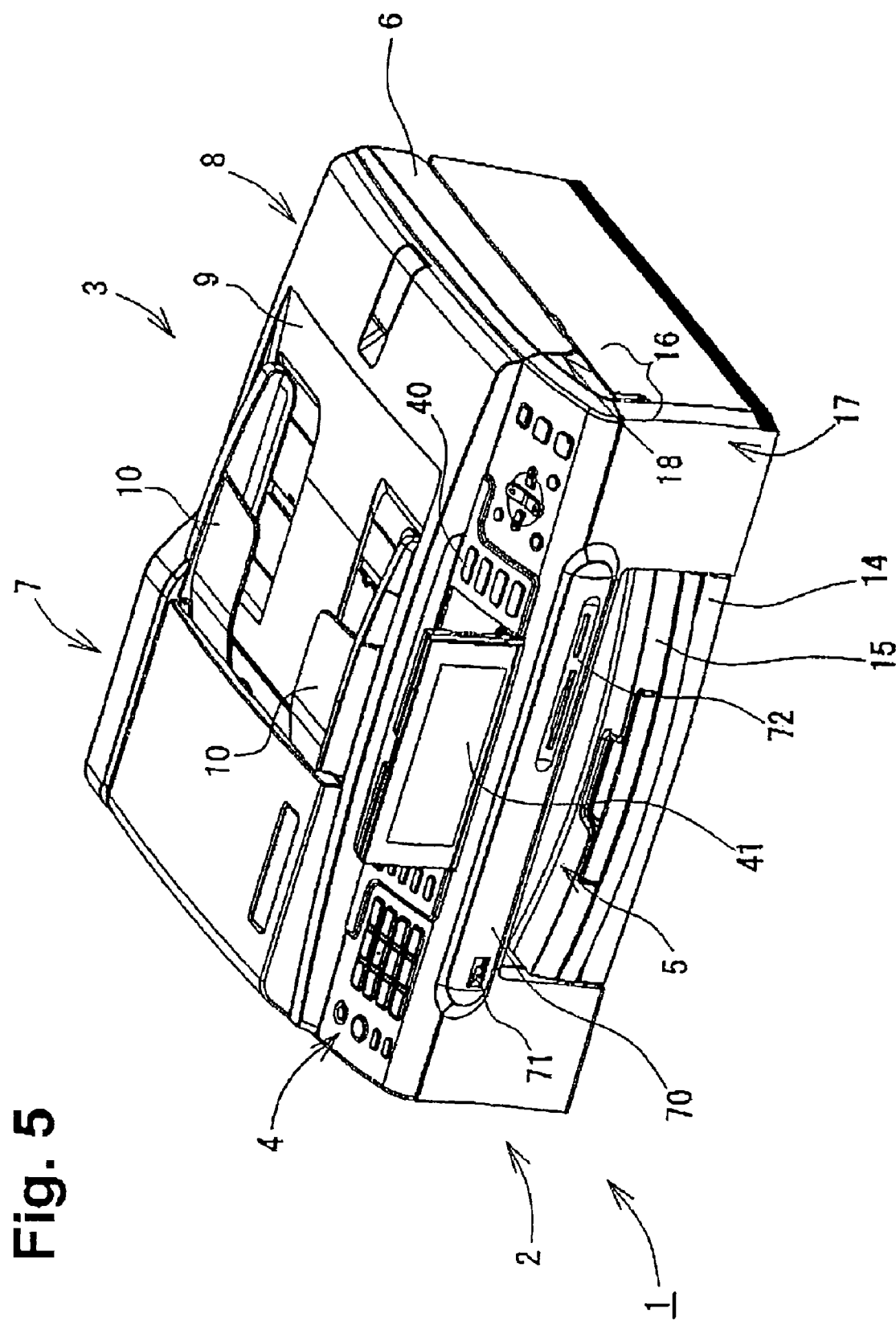
FIG. 5 is a perspective view of the multifunction device of FIG. 1, in which a display portion of the operation panel of FIG. 4 is in an erect position.

As shown in FIG. 1, the liquid crystal display portion 41 is inserted, such that the surfaces thereof and the operation panel 4 are formed on the same surface. The position of the liquid crystal display portion 41 is called an inserted position. Additionally, as shown in FIG. 5, the liquid crystal display portion 41 may be rotated to become erect. The position of the liquid crystal display portion 41 is called an erect position. Because the liquid crystal display portion 41 is inserted not to be projected from the surface of the operation panel 4, an appearance of the operation panel 4 may be improved. When looking down the multifunction device 1, the screen of the liquid crystal display portion 41 may be more readily recognized. Additionally, when the liquid crystal display portion 41 is erect, the screen of the liquid crystal display portion 41 may be more readily recognized from the front side of the multifunction device 1.

The liquid crystal display portion 41 may be positioned between the inserted position and the erect position by a so-called tilt feature. Accordingly, a user of the multifunction device 1 may change the position of the liquid crystal display portion 41 to any position, so as to more readily recognize the screen thereof.

Figure 6:
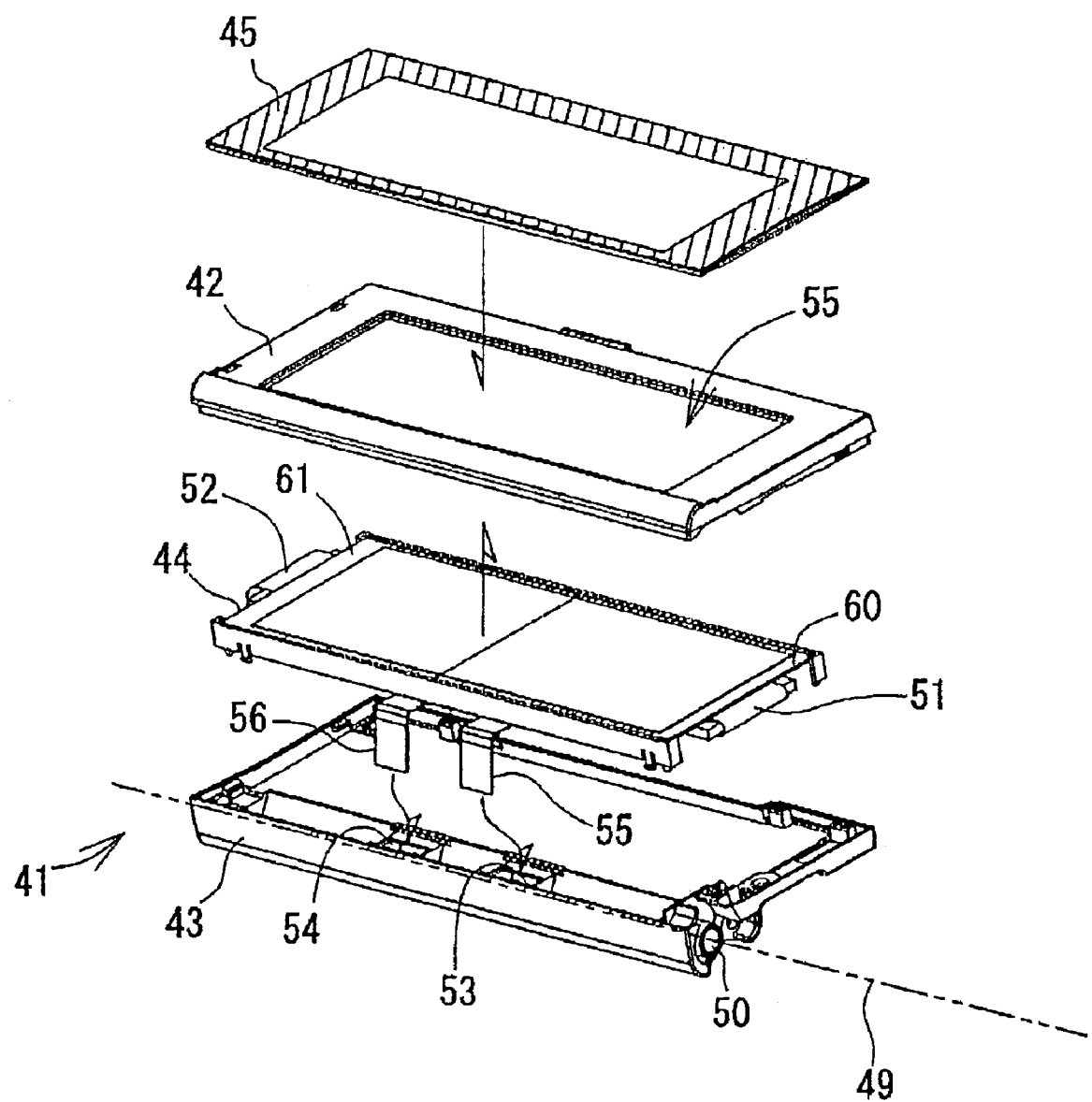
FIG. 6 is an exploded, perspective view of display portion of FIG. 5.

As shown in FIG. 6, the liquid crystal display portion 41 may comprise an upper cover 42 and a lower cover 43 which are a chassis of the liquid crystal display portion 41, the LCD unit 44, and a transparent cover 45 covering the upper cover 42.

The lower cover 43 may comprise the back surface and the periphery of the liquid crystal display portion 41 and has substantially rectangular plate in the plan view. Roller bearings 50, e.g., cylindrical bearings, may be positioned in both end sides of the front surface of the lower cover 43. By inserting a rotating axis (not shown) with a projection shape, which is provided in the operation panel 4, into the roller bearings 50, as a center of an axis line 49 of the roller bearings 50 and the rotating axis, the liquid crystal display portion 41 is sustained by the operation panel 4 so as to be rotated. Two through-holes 53 and 54 going through the back surface of the lower cover 43 may be formed adjacent to the middle of the front surface of the lower cover 43. Driver boards 51 and 52 with a sheet shape controlling a drive of the LCD unit 44 and flat cables 55 and 56 electrically connecting a control board, which is provided in the main body of the multifunction device 1 and comprises the control portion 20, may be inserted into the through-holes 53 and 54. The LCD controller 28 may be equipped on the control board. The driver boards 51 and 52 receive the electric signal from the LCD controller 28 to be driven, and a predetermined image may be displayed on the screen of the LCD unit 44.

The upper cover may be substantially rectangular and similar to the lower cover 43 in the plan view and comprises the front surface and the periphery surface of the liquid crystal display portion 41. By fabricating the lower cover 43 and the upper cover 42, an approximate parallelepiped chassis with an inner space suitable to house the LCD unit 44 may be formed. An opening 55 may have size which corresponds to the screen of the LCD unit 44 and may be formed on the front surface of the upper cover 42. The screen of the LCD unit 44 located in the inner space of the chassis comprised by the upper cover 42 and the lower cover 43 may be exposed through the opening 55.

The transparent cover 45 may be substantially rectangular similar to the upper cover 42 in the plan view. In the transparent cover 45, an area corresponding to the opening 55 of the upper cover 42 may comprise a transparent resin, and the periphery area (diagonal lines of FIG. 6) may be painted opaque. The screen of the LCD unit 44 exposed through the opening 55 is recognized through the transparent area of the transparent cover 45. The periphery area of the opening 55 of the upper cover 42, that is, the front surface, may be covered by the opaque area of the transparent cover 45.

Figure 7:
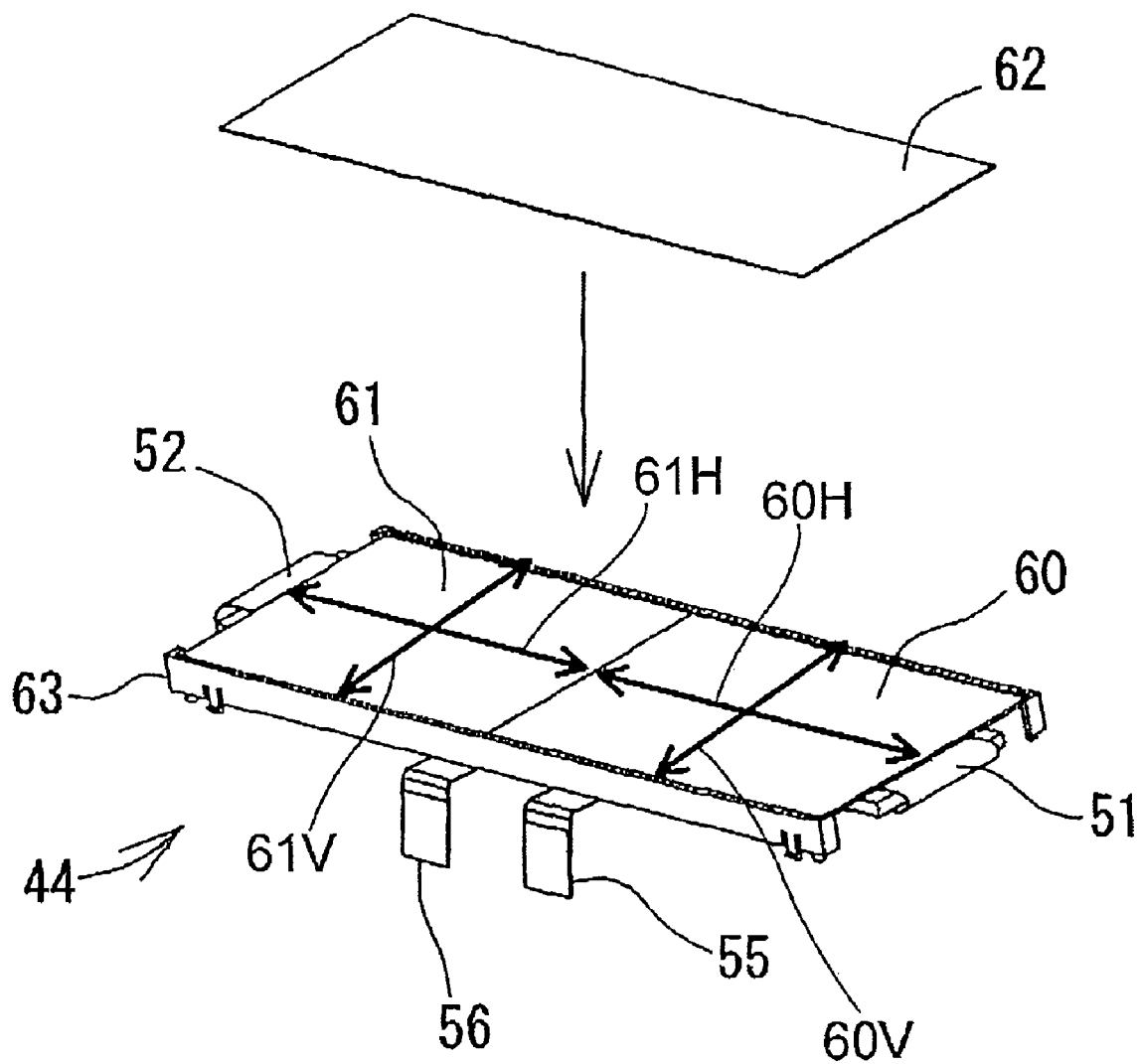
FIG. 7 is an exploded, perspective view of an LCD unit, according to an embodiment of the present invention.

As shown in FIG. 7, the LCD unit 44 comprises two LCD modules 60 and 61 horizontally arranged in a line, a protective sheet 62 attached on the screen of the LCD modules 60 and 61, and protection case 63. The LCD modules 60 and 61 are a liquid crystal display device integrally comprising a liquid crystal substrate and a backlight. The LCD modules 60 and 61 are connected to driver boards 51 and 52 respectively. The LCD modules 60 and 61 are display sub-portions. The LCD modules 60 has a vertical center line 60V and a horizontal center line 60H which is perpendicular to the vertical center line 60V. The LCD modules 61 has a vertical center line 61V and a horizontal center line 61H which is perpendicular to the vertical center line 61V. The length of each of the vertical center lines 60V and 61V may be about equal to the length of the vertical center line 41V of the liquid crystal display portion 41. Each aspect ratio of the LCD modules 60 and 61 used in the aspect of the embodiment may be 3:4. Because the LCD modules of the aspect ratio 3:4 are in great supply, are commonly used, and may be obtained at a reduced price, the cost may be reduced. Since so-called wide LCD modules of an aspect ratio 16:9, which are in increasing demand, may be obtained at a reduced price, the wide LCD modules may be also used. In an aspect of the embodiment, the LCD modules are used, but a plasma display, an EL display, an electronic paper (where all are examples of thin displays), for example, may be used.

The protection case 63 is used to protect the LCD modules 60 and 61 against outside impacts as well as to house the LCD modules 60 and 61. The LCD unit 44, which is a unit of the component, is formed by integrally fabricating the two LCD nodules 60 and 61 into the protection case 63. The LCD unit 44 is configured as one module itself.

Figure 8:
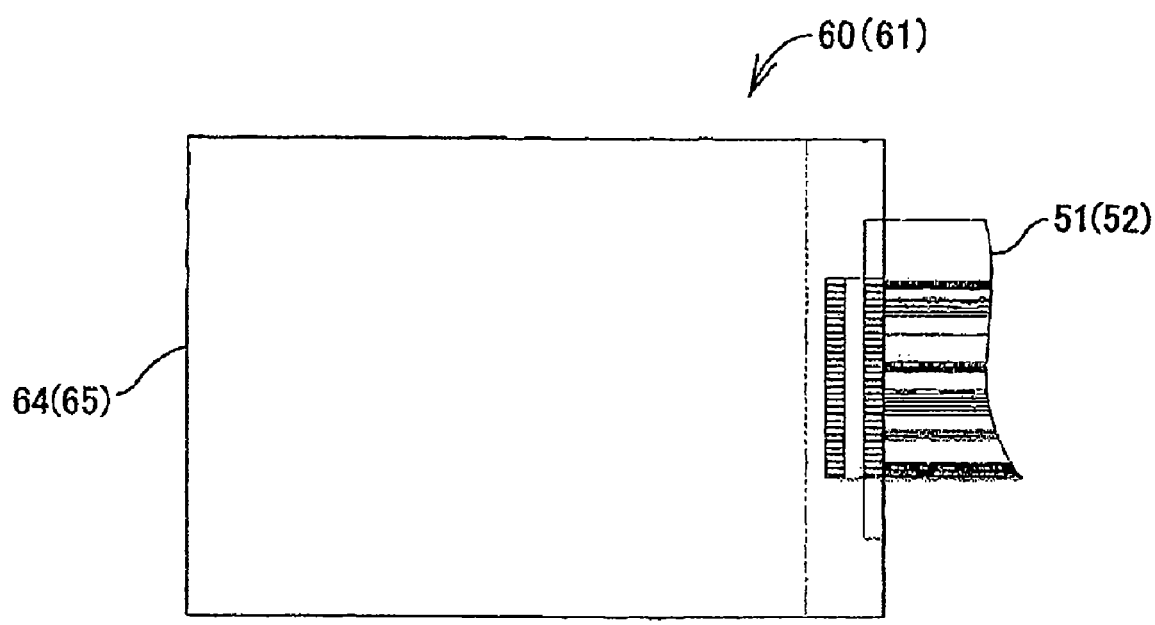
FIG. 8 is a plan diagram of an LCD module, according to an embodiment of the present invention.
Figure 9:
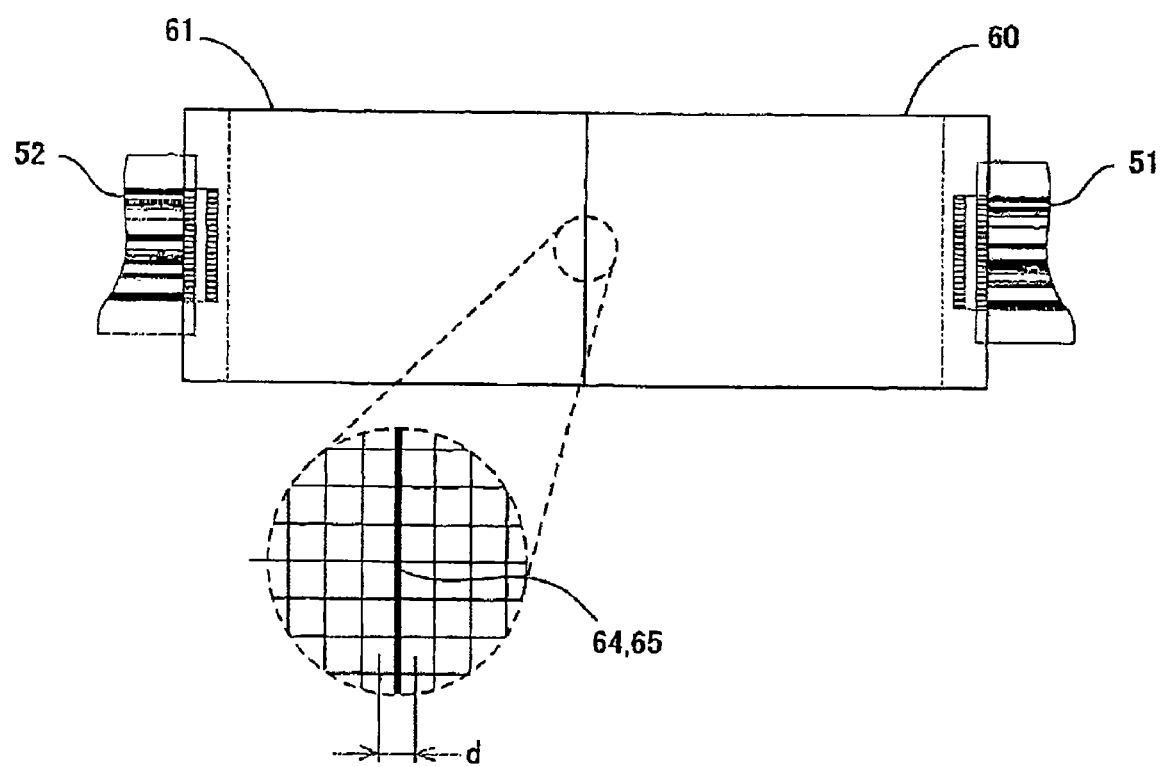
FIG. 9 is an enlarged diagram illustrating a border of a plurality of bonding ends, according to an embodiment of the present invention.

The short edge of the LCD module 60 extends in the vertical direction and the long edge thereof extends in the horizontal direction in the plan view. The vertical length of the LCD module 62 is that of the operation panel 4 and furthermore is approximately equal to that of the LCD unit 44. Accordingly, the LCD module is not arranged in the vertical direction and can comprise the LCD unit 44. As shown in FIG. 8, the driver board 51 on the sheet is connected to one short edge of the LCD module 60. The driver board 51 is curved toward the back surface of the LCD module 60 and is connected to an end of the flat cable 55. The LCD module 61 may be substantially symmetrical with respect to the LCD module 60, and the driver board 52 may be connected to the short edge of the LCD module 61, similar to the LCD module 60.

As shown in FIG. 7, short edges (hereinafter referred to as "bonding ends") 64 and 65 to which the driver boards 51 and 52 are not connected are bonded to each other and are disposed in the protection case 63. Members, such as the driver boards 51 and 52, the flat cables 55 and 56 or connectors, are not provided in the bonding ends 64 and 65. Accordingly, there is no gap in the bonding part (border part) in which the bonding ends 64 and 65 of the LCD modules 60 and 61 each are bonded, thereby closely adhering the bonding ends 64 and 65.

When the two LCD modules 60 and 61 are bonded to comprise one liquid crystal display portion 41 and the liquid crystal display portion 41 is driven, a white line with a belt shape extending along the bonding part in the vertical direction may occur. It is considered that the white line results from a main cause; some margin (space) which exists between the bonding ends 64 and 65 of the LCD modules 60 and 61. By highly accurately processing the bonding ends 64 and 65 and reducing the margin of the substrate as much as possible, a pitch d (see FIG. 9) between pixels neighboring each other and being away from the bonding parts may be approximately equal to a pitch between pixels in the LCD module 60 or 61. Accordingly, the white line may be removed.

Figure 10:
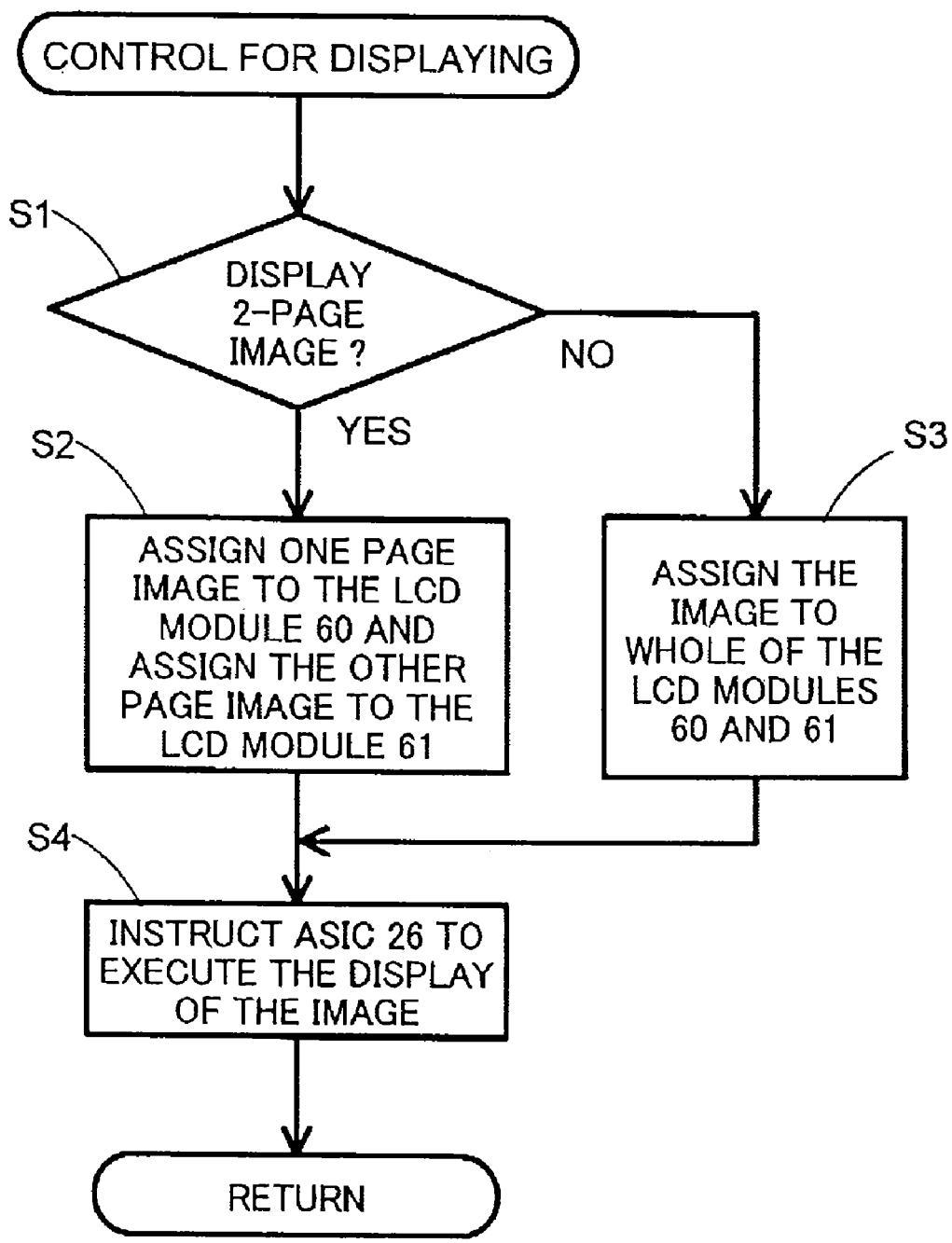
FIG. 10 is a control flow chart horizontally representing a two-page image in line, according to an embodiment of the present invention.

FIG. 10 is a flow chart of a control in which a 2-page image is displayed on the liquid crystal display portion 41. First, the control portion 20 determines whether the 2-page image is displayed from images of a plurality of pages in step S1. When the control portion 20 determines to display the 2-page image (Yes), the control portion 20 assigns one page of the 2-page image to the pixels corresponding to the LCD module 60 and assigns the other page of the 2-page image to the pixels corresponding to the LCD module 61 (step S2). When the control portion 20 determines not to display the 2-page image (No in step S1), the control portion 20 assigns the displaying image to the whole pixels, so as to be matched with the LCD) modules 60 and 61 (step S3). Sequentially, the control portion 20 instructs ASIC 26 to execute the display of the image (step S4). The image is displayed on the LCD modules 60 and 61 through ASIC 26 and the LCD controller 28. In accordance with the procedure, each page of the 2-page image is displayed on each of the LCD modules 60 and 61.

The center lines 4H, 4V, 41H, 41V, 60H, 60V, 61H and 61V described above are imaginary lines.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

The invention claimed is:

1. A multifunction device, comprising:
an image scanning unit;
an image printing unit;
an operation panel which is positioned on a front side of the image scanning unit, wherein the operation panel comprises a display portion, and each of the display portion and the operation panel has a horizontal center line and a vertical center line which is perpendicular to the horizontal center line, wherein a length of the vertical center line of the display portion is about equal to a length of the vertical center line of the operation panel, and a ratio of a length of the horizontal center line of the display portion to the length of the vertical center line of the display portion is greater than 4/3; and a display control portion configured to allocate to the display portion an image scanned by the image scanning unit, wherein the image comprises at least two separate pages.

2. The multifunction device according to claim 1, wherein the image scanning unit comprises a document scanning support configured to support a document to be scanned, and the image printing unit comprises a printing medium receptacle configured to hold a printing medium onto which an image is to be printed.

3. The multifunction device according to claim 1, wherein the image scanning unit is mounted to the image printing unit, and a back surface of the image scanning unit is continuous with a back surface of the image printing unit.

4. The multifunction device according to claim 2, wherein a maximum scanning size of the document is about equal to a maximum printing size of the printing medium.

5. The multifunction device according to claim 4, wherein the maximum scanning size and the maximum printing size are one of A4 size and letter size.

6. The multifunction device according to claim 1, wherein the ratio of the length of the horizontal center line of the display portion to the length of the vertical center line of the display portion is greater than or equal to the square root of 2.

7. The multifunction device according to claim 1, wherein the ratio of the length of the horizontal center line of the display portion to the length of the vertical center line of the display portion is greater than or equal to 17/11.

8. A multifunction device, comprising:
an image scanning unit;
an image printing unit;
an operation panel which is positioned on a front side of the image scanning unit, wherein the operation panel comprises a display portion, and each of the display portion and the operation panel has a horizontal center line and a vertical center line which is perpendicular to the horizontal center line, wherein a length of the vertical center line of the display portion is about equal to a length of the vertical center line of the operation panel, and a ratio of a length of the horizontal center line of the display portion to the length of the vertical center line of the display portion is greater than 4/3,
wherein the display portion comprises a plurality of display sub-portions which are arranged in a line, wherein each of the plurality of display sub-portions has a vertical center line and a horizontal center line which is perpendicular to the vertical center line, and each of the display sub-portions have a predetermined ratio of a length of the horizontal center line of the display sub-portion to a length of the vertical center line of the display sub-portion, and
wherein the length of the vertical center line of each of the display sub-potions is about equal to the length of the vertical center line of the display portion.

9. The multifunction device according to claim 8, wherein the plurality of display sub-portions comprises a pair of display sub-portions.

10. The multifunction device according to claim 8, wherein the plurality of display sub-portions are integrally mounted in a protection case.

11. A multifunction device, comprising:
an image scanning unit;
an image printing unit;
an operation panel which is positioned on a front side of the image scanning unit, wherein the operation panel comprises a display portion, and each of the display portion and the operation panel has a horizontal center line and a vertical center line which is perpendicular to the horizontal center line, wherein a length of the vertical center line of the display portion is about equal to a length of the vertical center line of the operation panel, and a ratio of a length of the horizontal center line of the display portion to the length of the vertical center line of the display portion is greater than 4/3,
wherein the display portion comprises a plurality of display sub-portions which are arranged in a line, wherein each of the plurality of display sub-portions has a vertical center line and a horizontal center line which is perpendicular to the vertical center line, and each of the display sub-portions have a predetermined ratio of a length of the horizontal center line of the display sub-portion to a length of the vertical center line of the display sub-portion, and
wherein the plurality of display sub-portions are disposed, such that a pitch between pixels of a first of the plurality of display sub-portions, which are substantially away from a border of the display portion and are adjacent to each other, is about equal to a pitch between corresponding pixels of a second of the plurality of display sub-portions, which are substantially away from the border of the display portion and are adjacent to each other.

12. The multifunction device according to claim 8, wherein each of the display sub-portions is one of a liquid crystal display, a plasma display, an EL display, and an electronic paper.

13. The multifunction device according to claim 8, wherein a ratio of the length of the horizontal center line of each of the display sub-portions to the length of the vertical center line of each of the display sub-portions is 4:3.

14. The multifunction device according to claim 8, wherein a ratio of the length of the horizontal center line of each of the display sub-portions to the length of the vertical center line of each of the display sub-portions is 16:9.

15. A multifunction device, comprising:
an image scanning unit;
an image printing unit;
an operation panel which is positioned on a front side of the image scanning unit, wherein the operation panel comprises a display portion, and each of the display portion and the operation panel has a horizontal center line and a vertical center line which is perpendicular to the horizontal center line, wherein a length of the vertical center line of the display portion is about equal to a length of the vertical center line of the operation panel, and a ratio of a length of the horizontal center line of the display portion to the length of the vertical center line of the display portion is greater than 4/3,
wherein the display portion comprises a plurality of display sub-portions which are arranged in a line, wherein each of the plurality of display sub-portions has a vertical center line and a horizontal center line which is perpendicular to the vertical center line, and each of the display sub-portions have a predetermined ratio of a length of the horizontal center line of the display sub-portion to a length of the vertical center line of the display sub-portion, and
wherein a first of the plurality of display sub-portions is configured to display a first image scanned by the image scanning unit, and a second of the plurality of display sub-portions is configured to display a second image scanned by the image scanning unit.

16. A multifunction device, comprising:
an image printing unit comprising a front wall, a back wall opposite the front wall of the image printing unit, and at least one side wall which is connected and substantially perpendicular to each of the front wall of the image printing unit and the back wall of the image printing unit, wherein a distance between the front wall of the image printing unit and the back wall of the image printing unit comprises a maximum depth dimension of the multifunction device;

an image scanning unit mounted to the image printing unit, wherein the image scanning unit comprises a back wall, and at least one side wall which is connected to the back wall of the image scanning unit, wherein the back wall of the image scanning unit is continuous and substantially flush with the back wall of the image printing unit, and the at least one side wall of the image scanning unit is continuous and substantially flush with a first portion of the at least one side wall of the image printing unit;

an operation panel mounted on a front side of the multifunction device, wherein the operation panel comprises a front wall, and at least one side wall which is connected to the front wall of the operation panel, wherein each portion of the front wall of the operation panel is at least one of slanted with respect to and substantially flush with the front wall of the image printing unit, and the at least one side wall of the operation panel is continuous and substantially flush each of the at least one side wall of the image scanning unit and a second portion of the at least one side wall of the image printing unit; and a display control portion configured to allocate to a display portion an image scanned by the image scanning unit, wherein the image comprises at least two separate pages.

17. The multifunction device of claim 16, wherein the operation panel comprises the display portion, and each of the display portion and the operation panel has a horizontal center line and a vertical center line which is perpendicular to the horizontal center line, wherein a length of the vertical center line of the display portion is about equal to a length of the vertical center line of the operation panel.

18. The multifunction device of claim 17, wherein a ratio of a length of the horizontal center line of the display portion to the length of the vertical center line of the display portion is greater than 4/3.

* * * * *